Figure 1:
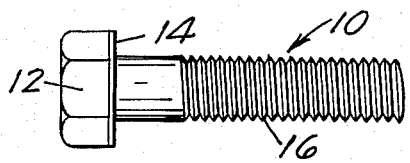

April 20, 1965  B. W. SCHULTZ ET AL  3,179,143
ADHESIVE LOCKED FASTENING DEVICES
Filed Feb. 29, 1960

INVENTORS
BERNARD W. SCHULTZ
ANDREW FARLEY THOMSON
by Carpenter, Abbott, Coulter & Kinney
ATTORNEYS

3,179,143
ADHESIVE LOCKED FASTENING DEVICES
Bernard W. Schultz, Roseville, and Andrew Farley Thomson, Edina, Minn., assignors to Minnesota Mining and Manufacturing Company, St. Paul, Minn., a corporation of Delaware
Filed Feb. 29, 1960, Ser. No. 282,192
3 Claims.  (Cl. 151—41.7)

This invention relates to metal fastening devices such as bolts, screws, nuts and the like, and more particularly relates to metal fastening devices having adhesive applied to their abutment surfaces (these surfaces which abut the surfaces of parts to be fastened or of other fastening devices), rather than lock washers, to maintain the devices against loosening from their tightened fastening position during use or service. This is a continuation-in-part of our application Serial No. 11,670, filed February 29, 1960, and now abandoned.

In the past it has been proposed to pre-apply various compounds to the threads of fasteners for maintaining such fasteners in place against loosening in service, and a variety of compounds have been suggested for this purpose. However, for one reason or another, such suggested compounds have not heretofore resulted in a successful product. One of the problems that has heretofore remained unsolved is that of pre-applying such compounds to fasteners at the point of fastener manufacture. None of the previously suggested compounds has possessed in its coated or applied form the requisite non-blocking, storage and handling properties necessary for pre-application while still providing the requisite amount of adhesive strength to function as a locking means against fastener loosening.

It has now been discovered that certain readily applicable adhesives, when applied to the abutment surfaces of threaded fastening devices rather than, or in addition to the threaded parts, not only possess relatively good non-blocking properties, i.e., non-tackiness, absence of stickiness to the touch, or of sticking to itself or other materials, during normal storage and handling, and stability against deterioration upon storage in the form of thin coatings at ambient temperatures during prolonged periods of time, e.g., for at least about six months, but also provide a remarkably strong, but still releasable, locking effect to maintain the fastening devices to which these adhesives are applied against loosening in service. Thus, fastening devices may be pre-coated with, or otherwise have applied to their abutment surfaces, these adhesives prior to use of the fastening devices.

These adhesives are those normally solid latent-curing polymerizable adhesives which, although relatively non-blocking and stable in thin coatings for prolonged periods under ambient conditions of temperatures and humidity, are nevertheless converted upon further polymerization by activation of the latent-curing portion of the system under the influnce of heat and/or pressure to aggressively adherent high strength adhesives which strongly bond and releasably lock the fastening devices to which they are applied to one another or to their fastened parts to a remarkable degree, the torque required to twist out the fastener usually being higher than the torque applied on fastening.

Examples of these normally relatively non-blocking, solid, latent-curing, polymerizable adhesives may be found in the various epoxy based families of adhesives, heat advancing vinyl-phenolic adhesives, and similar latent-curing adhesive systems.

Preferred adhesives for use in this invention are the 1,2-epoxy resin based normally solid, non-blocking, polymerizable adhesive systems containing latent-curing ingredients, which latent-curing systems, when activated, initially plasticize or soften and become aggressively adherent, and thereafter cross-link to a tough, internally strong, adherent state. The latent-curing ingredients of the system may be activated, depending upon their nature and in the manner in which they are incorporated in the adhesive, by means of heat and/or pressure. Exemplary formulation of two such adhesives are given hereinbelow.

(I)

| Ingredient: | Amount by weight |
|---|---|
| 64:36 butadiene-acrylonitrile rubber | 18.2 |
| Rubber curing additives | 1.7 |
| "EKRB 2002" (a solid 1,2-epoxy product of "Bisphenol–A" polyglycidyl ether, marketed by Bakelite) | 80 |
| "ERL 2774" (liquid "Bisphenol–A" polyglycidyl ether, 1,2-epoxy, marketed by Bakelite) | 20 |
| Dicyandiamide | 11 |
| $TiO_2$ (coloring agent) | 2 |

(II)

| Ingredient: | Amount by weight |
|---|---|
| ERL 2774 | 40 |
| EKRB 2002 | 60 |
| Dicyandiamide | 11 |
| $TiO_2$ | 2 |
| Formvar 15/95E (polyvinyl formal, marketed by Shawinigan Resins Corp., Springfield, Mass.) | 15 |
| 64:36 butadiene-acrylonitrile rubber | 1.8 |
| Rubber curing additives | 1.7 |

With respect to the rubber additives, these may be sulfur, sulfur containing accelerators, ZnO, and other similar materials commonly used for these purposes.

The rubber portions of the systems provide some flexibility in the final cured state of the adhesive systems. Where such flexibility is not required, the rubber and rubber additive portions of the systems may be dispensed with.

The epoxy resins form the backbones of the adhesive formulations I and II along with the latent-curing ingredient, dicyandiamide. The dicyandiamide is activated by heat, and consequently may be in direct contact with the epoxy during coating and storage.

As will be noted from the foregoing, the two formulations presented are heat activatable to promote cross-linking of the adhesive to its tough, aggressively adherent, high internal strength final state. However, an even more advantageous system is one wherein the latent-curing adhesive is activatable to cure to its final state by the simple application of pressure, such as would occur in screwing a screw or nut into place, and to this end one of the adhesive reactants, e.g. the epoxy or the latent-curing agent to promote curing at ambient temperatures, could be incorporated in the form of relatively homogeneously distributed capsules, preferably of microscopic size, with the capsule walls separating the reactants from one another, which capsules rupture upon the application of pressure or heat to cure or set the adhesive. Such formulations have the added advantage of having almost indefinite storage life under ambient conditions, because the latent-curing ingredient and the main body of the adhesive are maintained separate from one another by means of the capsule walls.

Epoxy systems lend themselves readily to this approach as for example, those such as are described in Patent No. 2,705,223. Either the epoxy resin curing agent or the epoxy resin itself may be encapsulated prior to mixing the ingredients. Preferably, it has been found desirable to encapsulate the epoxy resin rather than the curing agent and one manner in which this has been done is illustrated in the following examples.

Example 1

Capsules filled with the 1,2-epoxide resin reaction product of one mol bis-phenol A with 2 mols of epichlorohydrin (ERL–2795—Bakelite) were prepared as follows:

A precondensate of 440 grams of 37% formaldehyde in water (5.44 mols) had added thereto 164 grams of urea (2.74 mols) using 3.2 ml. of 75% triethanolamine as catalyst to form the precondensate. The reaction was carried out at room temperature for 1 hour following by dilution with 800 ml. of water. One fourth of the precondensate thus formed was converted to epoxy filled capsules as follows. First, a solution of dilute hydrochloric acid was prepared and 1.7 ml. of this solution was added to the precondensate at room temperature to provide a pH of about 4. Then, the fill material in the form of 120 grams of the epoxide resin noted previously (ERL 2795) was added to the mixture and the mixture agitated to achieve the desired particle size of the fill material.

Then, to maintain the desired acidity, another 1.7 ml. of the acid catalyst solution was added to the mixture slowly from a burette with continued agitation. After 15 minutes, 100 ml. of warm water (30–35° C.) was added and agitation continued for another 1 hour at about 30–35° C. Thereafter, 50 to 100 ml. of water was added and the heat of the mixture raised to about 40° C. for 3 to 4 hours after which time the capsules were formed and separated by filtering and drying.

A mixture of 10 grams of capsules, containing about 6.5 grams of epoxy resin, the capsule size varying from 100 to 300 microns, and 6.5 grams of an epoxy curing agent, a 75:25 combination of nonylphenol and aminoethylpiperazine, were mixed together to form a heavy adherent paste. The paste was applied to the under sides of the heads of screws and over the paste was coated a 3% aqueous solution of methyl cellulose to present a dry surface. When screws so coated were screwed into a test block and tightened, the capsules ruptured and the adhesive mixture cured, increasing the back-up or removal torque by 10 to 20%. Screws coated in this manner have been stored in contiguity with one another for considerable periods of time without deterioration of adhesive or development of undue tack, which would cause them to stick to one another in the container.

Example 2

A mixture of capsules in a water wet state and containing 20.5 grams of ERL–2795 epoxy resin had added thereto 20.5 grams of the curing agent of the preceding example. The components were mixed well to provide a heavy paste which was then thinned out by the addition of 13 grams of 3.3% aqueous methyl cellulose. This mixture had a very light thin paste consistency which could be readily spread onto the under surface of a bolt face and which dried tack-free. Bolts tested as in the preceding example with this coating displayed a 17% increase in removal torque when fresh.

While epoxy based systems are preferred in the encapsulation of adhesive components, suitable adhesive systems which are not epoxy based are also useful, one formulation of which is set forth hereinafter.

(III)

| Ingredient: | Amount by weight |
|---|---|
| Heat curing phenolic varnish resin, such as Bakelite BLS 2700 or Monsanto Resin OX 451 | 1.7. |
| Polyvinyl butyral resin | 1.0. |
| Stabilizer (hydroquinone) | 0.001. |
| Volatile solvent (toluol and ethyl alcohol) | Sufficient to dilute to 35% solids for coating. |

There is illustrated in the several figures of the accompanying drawing fastening devices having adhesive applied thereto in accordance with this invention, as well as the manner of use of such fastening devices. Thus, there is shown in FIGURE 1 a side elevation view of a cap screw having a layer of adhesive applied to the under side of the head thereof; there is shown in FIGURE 2 a hexagonal nut having a layer of adhesive applied to one of the faces thereof; in FIGURE 3 there is shown the application of the adhesive carrying cap screw of FIGURE 1 in fastening parts together; and in FIGURE 4 there is shown the utilization of the adhesive layers on both nuts and bolts in fastening parts together.

Referring now to the accompanying drawings in detail, a cap screw is designated in its entirety by the numeral 10 in FIGURE 1 and has applied to the under surface of the head 12 thereof a layer of non-blocking, stable, polymerizable adhesive 14. The shank 16 of the screw may also be coated with this adhesive if desired, and the adhesive may be applied from solvent solution as a coating, by hot dipping, or other means. Further, the adhesive layer 14 on the under side of the head 12 may be stamped from a solid film and simply pressed in place.

Figure 2:
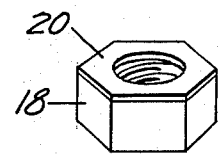

In FIGURE 2 there is disclosed a hexagonal nut 18 on one face of which is a layer of adhesive 20, which may be applied thereto in the same manner as noted in the application of the adhesive layer 14 to the under side of the head 12 of the screw 10.

Figure 3:
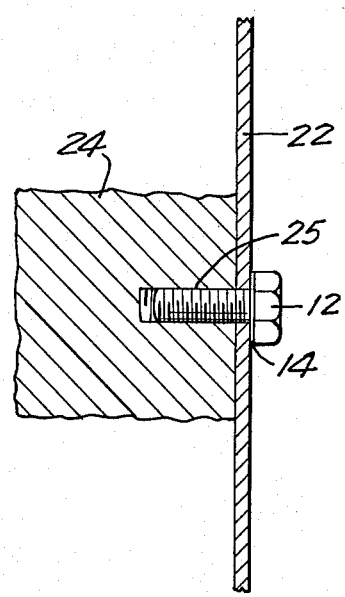
Figure 4:
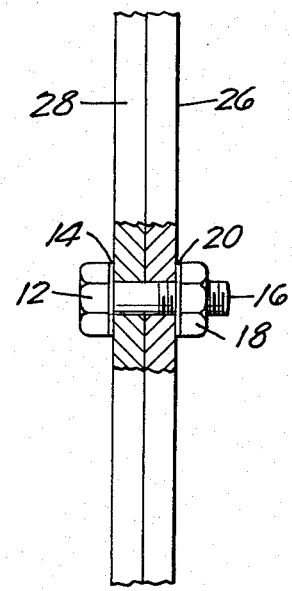

The utilization of these adhesive carrying fastening devices 10 and 18, and the manner in which they function as lock washers, is illustrated in FIGURES 3 and 4.

In FIGURE 3 there is disclosed a solid block 24 having a tapped hole 25 against which a metal plate or other part 22 is abutted by means of the cap screw 10 of FIGURE 1, the cap screw being threaded into the tapped hole 25 so that the head 12 of the screw presses the part 22 against the block 24. Upon tightening the screw down, the adhesive layer 14 on the under surface of the head thereof abuts the part 22, and upon activation of the adhesive, firmly locks the screw in place against loosening upon vibration of the part, while yet permitting release of the adhesive and disassembly of the parts when desired simply by applying initially a loosening torque sufficiently higher than the tightening torque to release the adhesive.

In FIGURE 4 a pair of parts 26 and 28 of relatively thin cross sections, such as plates or the like, are held together by means of the head 12 of the cap screw and the adhesive face of the nut 18 pressing the parts together as the nut is threaded onto the shank 16 of the screw. Here again, upon activation of the adhesive 14 and the adhesive 20, the nut and bolt head are held in firm engagement with the parts with sufficient force to serve as lock washers.

Normally less torque is required to loosen a screw or nut than is required to tighten it, because of metal yield; thus, in order to serve a locking function in the securement of fastening screws, nuts and the like in place against loosening in service or use, the adhesive upon activation must possess a resistance to a torquing force greater than the torquing force applied in tightening the fastening device. The adhesive compositions of the type described herein accomplish this result, as is apparent in the example following.

Example 3

To the under side of each of the heads of three 5/16″ diameter hexagonal head cap screws, of the kind illustrated in FIG. 1, was applied a solid adhesive layer of the thermosetting polymerizable adhesive compositions described hereinbefore as I, II and III. These compositions are all 100% solids compositions and are stable in their coated form at room temperatures for periods as long as six months; they are relatively non-blocking under normal conditions of storage and handling.

These screws, so coated, were then torqued into the tapped hole of a tapped steel block such as 24 of FIG- URE 3, and tightened down with a torque wrench to 30 foot pounds of torque. The assembly was thereafter heated in an oven having a temperature of 350° F. for a period of 45 minutes and then removed and permitted to return to normal room temperature. Thereafter the torque wrench was again applied to loosen the screws from the tapped holes. The results are set forth in the table below.

| Adhesive | Torque applied to tighten (foot pounds) | Torque applied to loosen (foot pounds) |
|---|---|---|
| I | 30 | 59 |
| II | 30 | 44.5 |
| III | 30 | 33 |

The foot pounds of torque to release the cap screws from their fastening engagement represent the average for each set of three cap screws, and as is apparent, was in all cases greater to loosen than was applied in tightening.

From the foregoing description the invention will be apparent to those skilled in the art. However, since numerous modifications and changes pertaining to the adhesives and the manner of their application not specifically recited hereinbefore will occur to those skilled in the art, it is not my intention to limit the invention to the specific adhesives and techniques of application described herein, but all suitable modifications are contemplated which fall within the ambit of the appended claims.

What is claimed is:

1. A metal fastening device having an adhesive coating on the abutment surfaces thereof for releasably locking such device to another part in contact therewith, said adhesive being normally solid and non-adhering but pressure activatable to an adhesive state, said adhesive coating comprising coreactants, one of said coreactants being a continuous coating having dispersed therein a second coreactant separated therefrom by encapsulation in microscopically small capsules which rupture upon the application of pressure to activate said adhesive.

2. A metal fastening device having an adhesive coating on the abutment surfaces thereof for releasably locking such device to another part in contact therewith, said adhesive being normally solid and non-adhering but pressure activatable to an adhesive state, said adhesive comprising coreacatants of an epoxy resin and a curing agent therefore, one of said coreactants being separated from the other by encapsulation in microscopically small capsuls which rupture upon the application of pressure to activate the adhesive, the other of said coreactants comprising a continuous binder in which said capsules are dispersed.

3. In a screw threaded fastener having a metallic abutment surface for frictional engagement with the surface of a part to be fastened in place thereby, a latent-curing polymerizable adhesive coating on said abutment surface, said coating being normally solid, non-blocking and stable for prolonged periods of time under ambient conditions, which coating is further polymerizable to an initially aggressively adherent plastic state and finally to a tough, high internal strength adhesive capable of maintaining the fastener in tightened position under a loosening torque force at least as great as the torque force applied in tightening the fastener, said fastener having an enlarged head and a threaded shank, said coating being applied to the underside of said head, said coating comprising coreactants of an epoxy resin and a curing agent therefor, one of said coreactants being separated from the other by encapsulation in microscopically small capsules which rupture upon the application of pressure to activate the adhesive.

References Cited by the Examiner

UNITED STATES PATENTS

| | | | |
|---|---|---|---|
| 2,235,078 | 3/41 | Meisterhans | 151—41.7 X |
| 2,426,653 | 9/47 | Whelan et al. | 151—41.7 |
| 2,928,446 | 3/60 | James et al. | 151—7 |
| 2,939,805 | 6/60 | Johnson | 151—7 X |
| 2,988,461 | 6/61 | Eichel. | |

EDWARD C. ALLEN, *Primary Examiner.*